Patented Sept. 5, 1922.

1,428,088

UNITED STATES PATENT OFFICE.

JAMES H. GRAVELL, OF ELKINS PARK, PENNSYLVANIA.

SOLDERING SOLUTION.

No Drawing. Application filed December 20, 1921. Serial No. 523,765.

*To all whom it may concern:*

Be it known that I, JAMES H. GRAVELL, a citizen of the United States, residing at Elkins Park, in the county of Montgomery and State of Pennsylvania, have invented a new and useful Improvement in Soldering Solutions, of which the following is a specification.

This invention relates to improvements in soldering fluxes, more particularly to soldering fluxes for soft soldering, yet soldering fluxes embodying the invention may be used to advantage for hard soldering and even for welding.

The application of a flux in uniting metallic surfaces by heat is generally practiced, but difficulty is encountered in making known fluxes adhere properly to the metal in such a way as to provide intimate contact or thorough wetting.

This difficulty is due to a surface tension condition and is especially evident when aqueous solutions are used as fluxes and this difficulty is also especially manifest when the metal surface is oily even to the smallest extent.

The primary object of this invention is to avoid the above mentioned defects and disadvantages and to provide a flux that will easily wet a surface that is to be soldered, welded or brazed. Another object of the invention is to produce an improved soft soldering flux. Another object of the invention is to produce a self-cleaning flux or, in other words, a flux that also cleans the metallic surface to which it is applied.

The invention will be described in connection with soft soldering cold rolled steel such, for instance, as is used in the manufacture of automobile bodies.

According to present practice, the soldering flux is applied to the metal and thoroughly rubbed with steel wool or other abrasives in order to make it adhere to the surface. The soldering iron is then tinned by rubbing it with molten solder on a block of sal ammoniac. The solder is then applied to the metal wetted with the flux with the result that the metal becomes soldered.

I have discovered, however, that if a higher alcohol, that is, alcohol boiling at a higher temperature than ethyl alcohol, is one of the ingredients of the soldering flux, it quickly wets a surface even though the surface be oily and the scrubbing operation with the abrasive may be dispensed with and entirely eliminated. This in actual practice saves considerable time.

One soldering solution embodying the invention for soft soldering is made as follows:

Zinc chloride_____ 12.00 lbs.
Fusel oil_____ .95 gals.

These make a sort of paste which produces satisfactory results. Fusel oil, of course, consists mostly of alcohols which boil at a higher temperature than ethyl alcohol, and those alcohols alone or in various combinations are included in the term fusel oil throughout this specification and in the claims.

A suitable formula for a flux of the invention for brazing consists of—

Borax _____ 4.00 lbs.
Fused oil_____ .95 gals.

This also makes a paste.

A suitable formula for welding is:

Silica sand_____ 2.00 lbs.
Borax _____ 2.00 lbs.
Fusel oil_____ .95 gals.

This provides a flux of the invention in paste form.

I find that the property of wetting an oily surface is retained by fluxes containing fusel oil even when diluted with large quantities of ethyl alcohol, so that my formula for soft soldering can be cheapened by using the following ingredients:

Ethyl alcohol_____ .75 gals.
Fusel oil_____ .20 "
Zinc chloride_____ 12.00 lbs.

This makes a semi or fluid paste.

This soldering flux works satisfactorily where a relatively high temperature soft solder is used. When a relatively low temperature soft solder is used, the addition of sal ammoniac is advisable so that the following formula is recommended:

Ethyl alcohol_____ .75 gals.
Fusel oil_____ .20 "
Zinc chloride_____ 12.00 lbs.
Ammonium chloride____ 1.50 lbs.

This makes a fluid.

The above formula produces a very satisfactory soft soldering flux, but it does not have the power of removing oxidation from the metal prior to the application of the solder.

In order to make a self-cleaning flux, I add to the above formula hydrochloric acid so that the formula becomes:

| | |
|---|---|
| Ethyl alcohol | .75 gals. |
| Fusel oil | .20 gals. |
| Zinc chloride | 12.00 lbs. |
| Ammonium chloride | 1.50 lbs. |
| Hydrochloric acid | 2.00 gals. |

This formula produces a fluid self-cleaning soldering flux which easily wets a surface even though it be oily.

The above formula may be cheapened to some extent by the addition of water, producing the following formula:

| | |
|---|---|
| Ethyl alcohol | .75 gals. |
| Fusel oil | .20 gals. |
| Water | 1.00 gals. |
| Zinc chloride | 12.00 lbs. |
| Ammonium chloride | 1.50 lbs. |
| Hydrochloric acid | 2.00 gals. |

It is well known that hydrochloric acid fumes strongly in the air, but I have found that when the hydrochloric acid is incorporated in a solution with the higher alcohols as given in my formula no noticeable or objectionable odor of hydrochloric acid is produced. In other words, the hydrochloric acid does not fume.

The proportions of the various ingredients given in my formula may be varied to a large extent without departing from the spirit of the invention. For instance, if the surface to be acted on is very slightly oxidized or not oxidized at all, the quantity of hydrochloric acid may be materially reduced or it may be entirely eliminated. If the surface to be acted on is entirely free from oil, the quantity of fusel oil may be materially reduced. If a large quantity of flux is to be applied, the quantity of zinc chloride can be materially reduced or if a small quantity of soldering solution is required the zinc chloride can be increased.

As the invention is of a chemical nature, it is well understood by those skilled in the art that chemical equivalents can be substituted for the specific ingredients mentioned. For instance, the ethyl alcohol can be replaced by wood alcohol or acetone; the fusel oil may be replaced by butyl or other alcohols; the zinc chloride can be replaced by zinc bromide or other salts of the halogen group having fluxing qualities and proper melting points.

In practice the soldering solution is applied to the work and allowed to remain on the work a sufficient time to thoroughly clean the work. Its action may be assisted by rubbing with emery cloth or steel wool, if desired. Then, without wiping the solution from the work, it is immediately soldered by a torch or an iron in the regular way.

I claim:

1. An admixture for fluxing of which one ingredient is an alcohol boiling at a higher temperature than ethyl alcohol.

2. An admixture for fluxing metal of which one ingredient is a mono-hydric alcohol which boils at a higher temperature than ethyl alcohol.

3. A soldering solution comprising zinc chloride and fusel oil.

4. A soldering solution comprising zinc chloride, ammonium chloride and fusel oil.

5. A soldering solution comprising zinc chloride, ammonium chloride, fusel oil and ethyl alcohol.

6. A soldering solution comprising zinc chloride, ammonium chloride, fusel oil, ethyl alcohol and hydrochloric acid.

JAMES H. GRAVELL.